United States Patent Office 3,451,933
Patented June 24, 1969

3,451,933
FORMAMIDO-CONTAINING ALKENYLSUCCINATES
Norman A. Leister, Huntingdon Valley, Pa., assignor to Rohm and Haas Company, Philadelphia, Pa., a corporation of Delaware
No Drawing. Filed Aug. 11, 1967, Ser. No. 659,888
Int. Cl. C10m 1/36; C10l 1/22; C07d 51/70
U.S. Cl. 252—51.5                           13 Claims

ABSTRACT OF THE DISCLOSURE

The novel formamido-containing alkenylsuccinates of this invention are useful as dispersants, corrosion inhibitors and anti-wear agents particularly in lubricating oil and fuel compositions. The formamide compounds are prepared by reacting (1) an alkenylsuccinic anhydride, an alkenylsuccinic acid or an alkenylsuccinamic acid and (2) at least one formamido-containing hydroxy compound having the formulas:

(A)
$$H(O-A)_x-\underset{\underset{R_2}{|}}{N}-[(CH_2)_z-CH-\underset{|}{N}-]_yR_1$$
$$\phantom{H(O-A)_x-N-[(CH_2)_z-}\overset{CHO}{|}\phantom{CH-}\overset{CHO}{|}$$

(B)
$$H(O\overset{R_3}{\underset{|}{C}}H-CH_2)_a-\underset{|}{N}-(CH_2-\overset{R_3}{\underset{|}{C}}H-O)_b-H$$
$$\phantom{H(OCH-CH_2)_a-}\overset{CHO}{|}$$

or (C)
$$H(O\overset{R_3}{\underset{|}{C}}H-CH_2)_c-N\underset{CH_2-CH_2}{\overset{CH_2-CH_2}{\diagup\diagdown}}N-CHO$$

wherein
A is alkylene
$R_1$, $R_2$ and $R_3$ are hydrogen or hydrocarbon
$a$, $b$, $c$, $x$, $y$ and $z$ are integers and $y$ may be zero.

BACKGROUND OF THE INVENTION

Internal combustion engines used for vehicles engaged in short run travel (i.e. the so called stop and go driving) do not reach their most efficient operating temperature. Therefore large amounts of undesirable products produced by incomplete combustion of the fuel and oil-insoluble oxidation products from lubricants and other sources accumulate within the internal combustion engine. If these undesirable products deposit on the engine parts, the result is a further reduction of the engine's efficiency. To prevent the accumulation of foreign matter and the deposition of sludge, a dispersant is employed as an additive to the lubricating oil so that the oil-insoluble foreign matter and sludge will remain suspended in the oil and not deposit on any of the vital engine parts.

In addition to the problem of engine deposits, the combustion products of the fuel may cause excessive wear, especially when the engine is operating under relatively cold conditions which results in an accumulation of moisture and acid products on the engine surfaces. This accumulation promotes wear on various engine parts.

SUMMARY OF THE INVENTION

It is an object of this invention to prepare novel compounds that may be incorporated into lubricating oils or liquid hydrocarbon fuels for the purpose of dispersing sludge, inhibiting corrosion and acting as anti-wear agents.

The novel compounds of this invention are prepared by reacting an alkenylsuccinic anhydride, alkenylsuccinic acid or alkenylsuccinamic acid and at least one formamido-containing hydroxy compound represented by formulas A, B and C. Alternatively, alkenylsuccinic dihalides or diesters may be used as the acid component in preparing the novel alkenylsuccinates. The compounds of this invention are useful as dispersants in lubricating oil and fuel systems. They may be used in the range of about 0.005 to 15% by weight of the oil or fuel composition. The compounds of this invention, as evaluated according to several standard tests, exhibit outstanding activity as dispersants.

DETAILED DESCRIPTION OF THE INVENTION

The novel formamido-containing alkenylsuccinates are prepared by reacting (1) an alkenylsuccinic anhydride, an alkenylsuccinic acid or an alkenylsuccinamic acid and (2) at least one formamido-containing hydroxy compound of the following formulas:

(A)
$$H(O-A)_x-\underset{\underset{R_2}{|}}{N}-[(CH_2)_z-CH-\underset{|}{N}-]_yR_1$$
$$\phantom{H(O-A)_x-N-[(CH_2)_z-}\overset{CHO}{|}\phantom{CH-}\overset{CHO}{|}$$

(B)
$$H(O\overset{R_3}{\underset{|}{C}}H-CH_2)_a-\underset{|}{N}-(CH_2-\overset{R_3}{\underset{|}{C}}H-O)_b-H$$
$$\phantom{H(OCH-CH_2)_a-}\overset{CHO}{|}$$

or (C)
$$H(O\overset{R_3}{\underset{|}{C}}H-CH_2)_c-N\underset{CH_2-CH_2}{\overset{CH_2-CH_2}{\diagup\diagdown}}N-CHO$$

wherein
A is an alkylene group having 2 to 4 carbon atoms,
$R_1$ is hydrogen, a $(C_1-C_{24})$-alkyl group, a $(C_5$ to $C_7)$-cyclic aliphatic group, phenyl, benzyl, or a $(C_1$ to $C_4)$-alkyl substituted phenyl,
$R_2$ and $R_3$ are independently selected from hydrogen and methyl, $a$ is an integer having a value of at least 1,
$b$ is an integer having a value of at least 1 and the sum of $a$ plus $b$ has a value of from 2 to 30,
$c$ is an integer having a value of from 1 to 5,
$x$ is an integer having a value of from 1 to 30, preferably 1 to 4,
$y$ is an integer having a value of from 0 to 4 and
$z$ is an integer having a value of from 1 to 5.

The alkenylsuccinic compound may also be reacted with a mixture of various proportions of the formamido-containing hydroxy compounds described in Formula A, B and C. Formamido-containing hydroxy compounds within the scope of Formulas A and C, when employed concurrently with one or more Formula B alcohols, will act as chain terminators in the polyester reaction.

Typically A will represent ethylene, butylene or propylene. Representative $R_1$ groups are hydrogen, methyl, ethyl, buty, octyl, decyl, dodecyl, tetradecyl, octadecyl, tetracosyl, cyclopentyl, cycohexyl, phenyl, methylphenyl, butylphenyl, xylyl, dibutylphenyl and benzyl.

The formamides of Formula A are generally a known class of compounds. When, in Formula A, $x$ is 1 and $y$ is 0, the formamides may be obtained by the reaction in conventional fashion of an aminoalkanol or N-substituted aminoalcohol and carbon monoxide in the presence of a catalyst and a solvent. N-methyl-N-hydroxyethylformamide may be prepared from methylaminoethanol and carbon monoxide using a methanol solvent and a methanolic 50% choline solution as a catalyst. Similarly hydroxyethylformamide is prepared from ethanolamine and carbon monoxide. These reactions are described in U.S. Patent No. 2,793,211.

The general class of N-substituted formamides of Formula A when $x$ is two or more, $y$ is one or more and $R_1$ is a hydrocarbon radical may be prepared by well known methods. For example, an aminoalkanol, i.e. $HOCH_2—CH_2NH_2$, $HO—CH_2CH_2CH_2—NH_2$ etc., is reacted with y moles of propylene imine to give the corresponding hydroxypolyaminoalkylene compound, i.e.

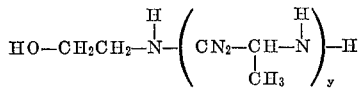

Alkylation of the primary amine may be achieved with the appropriate halide ($R_1X$, wherein $R_1$ is as previously defined and X is the chloride or bromide) in the presence of a hydrogen halide acceptor such as sodium carbonate, to yield the following:

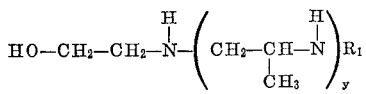

Representative halides are methyl chloride, butyl chloride, decyl chloride and benzyl chloride. Formylation of this intermediate can be carried out readily with ethyl formate at reflux temperatures or with formic acid at reflux temperatures. Condensation with the appropriate alkylene oxide or diol, i.e. ethylene oxide, isopropylene oxide, 1,3-propylene diol etc., in the presence of an acid catalyst, i.e. p-toluene sulfonic acid will then result in the desired N-substituted formamide. The class of compounds of Formula A when y and z are more than 1 or even when y or z are one may be prepared by starting with an appropriate alkylenepolyamine and reacting this with the desired alkyl halide in the presence of an acid acceptor such as sodium carbonate. The resulting N-substituted alkylene polyamine is then reacted with an alkylene oxide such as ethylene oxide and this product is subsequently formylated to yield the desired Formula A compound. Representative alkylenepolyamines include ethylene diamine, diethylenetriamine, triethylenetetramine, tetraethylenepentamine and hexamethylene diamine.

The following descriptions are illustrative of well known methods for preparing compounds within the scope of Formula A.

Preparation A

A 3-neck round bottom flask was equipped with a thermometer, stirrer and reflux condenser. There was added to the flask 116 g. of hexamethylene diamine, 176 g. of n-decyl chloride, 50 g. of benzene and a solution containing 55 g. of sodium carbonate. The solution was brought to benzene reflux and held there approximately one hour. The reaction mixture was cooled, the benzene layer separated and in a suitable distillation apparatus the benzene was stripped off to leave a residue containing N-decyl hexamethylene diamine. This residue was then added to a 3-neck flask equipped with a thermometer, stirrer and gas inlet-exit tubes. Ethylene oxide was bubbled through this mixture at 130° C. The product of the following structure was isolated

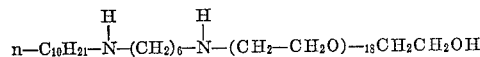

To the N-polyethoxy-N'-decyl hexamethylene diamine in benzene was added 110 g. of ethyl formate. The solution was heated to benzene reflux and held there for 2 hours. The reflux condenser was then removed and the benzene, ethanol and unreacted ethyl formate were stripped from the mixture. The residue contained the desired product N-formyl-N - hydroxyethyl (polyoxyethyl)$_{18}$-N'-formyl-N'-decyl hexamethylene diamine of the following structure:

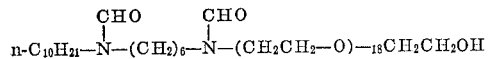

Preparation B

A 3-neck round bottom flask was equipped with a thermometer, gas inlet tube, stirrer and reflux condenser. There were added to the flask 130 g. of n-octylamine and 32 g. of benzene. Propylene imine was then fed into the solution at ambient temperature. The major product isolated from the mixture was 2[2-(2-octylaminoisopropylamino)isopropylamino]isopropylamine and has the following structure:

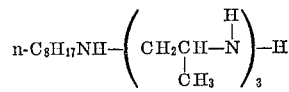

This tetraamine (175 g.) was dissolved in benzene in a 3-neck flask equipped with a thermometer, gas inlet-exit tubes and stirrer. Ethylene oxide was passed into the system held near ambient temperature such that the mono adduct was formed. Formic acid (162 g.) was added to the monoethylene oxide adduct and the solution was held at benzene reflux for 3 hours. The product isolated from this reaction was 3,6,9,12-tetraazaformyl-4,7,10-trimethyleicosyl alcohol and had the following structure:

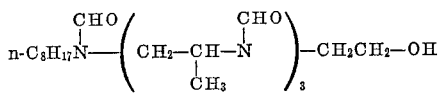

Preparation C

A 3-neck round bottom flask was equipped with a thermometer, stirrer and reflux condenser. There were added to the flask 22.5 g. of 2-aminoethanol, 10 g. of benzene, 32 g. of ethyl chloride and a solution containing 27 g. of sodium carbonate. The solution was brought to benzene reflux and held there for 0.5 hour. The reaction mixture was cooled, the benzene layer was separated and in a suitable distillation apparatus the benzene was removed by distillation. There was added to the residue 48 g. of ethyl formate and the temperature was increased to 50° C. and the mixture was stirred at this temperature for 1 hour. Unreacted ethyl formate and ethanol were stripped from the reaction mixture to leave approximately 90 g. of crude N-(2-hydroxyethyl)-N-ethyl formamide.

Dihydroxy compounds within the scope of Formula B may be prepared by the reaction of either diethanolamine or dipropanolamine with a compound capable of generating a formyl radical such as ethyl formate. Alkoxylation of the dihydroxy product is accomplished by standard procedures using either ethylene oxide, propylene oxide or portions of both of the aforementioned alkylene oxides.

Preparation D

Diethanolformamide is prepared as follows: 210 grams (2 moles) of diethanolamine is charged to a reaction flask fitted with a stirrer, a reflux condenser, a thermometer and a dropping funnel. The charge is heated with stirring to a temperature of 95–100° C. and then 163 grams (2.2 moles) of ethyl formate is added over a period of one hour. The mixture is then heated at reflux for 4 hours. Ethanol and unreacted ethyl formate are removed from the reaction mixture by distillation, raising the pot temperature to 130° C. then gradually reducing the pressure on the system to 10 mm. to ensure complete stripping. A clear light colored product, diethanolformamide, was recovered as a stripped residue and was characterized by the following properties:

*Elemental analysis.*—Calc. for $C_5H_{11}NO_3$: 10.51% N; 36.05% O. Found: 10.4% N; 36% O.

Hydroxyl No. Calc. 842, Found 828.

Formula C compounds are prepared by the formylation of 2-hydroxyethlpiperazine with a formyl generating compound such as ethyl formate. The reaction product, N-hydroxyethyl-N'-formylpiperazine, may be alkoxylated by conventional procedures.

Preparation E 130 grams of 1-piperazinoethanol was refluxed for a period of 4 hours with a 10% mole excess of ethyl formate. The formamide was recovered as a stripped residue, by distilling off the unreacted ethyl formate and ethanol while gradually reducing the pressure to 100 mm. Hg and holding the pot temperature to 100° C. maximum. The N-hydroxyethyl-N'-formylpiperazine product was of a light-amber color and was characterized by the following properties:

*Elemental analysis.*—Calc. for 17.71% N: 20.23% O. Found: 16.83% N; 21.83% O.

Hydroxyl No. Calc. 354.6, Found 359.8

Preparation F 1 mole (158 gms.) of N-hydroxyethyl-N'-formylpiperazine and 0.05 mole of sodium methylate (25% in methanol) were charged to a pressure type reaction vessel and agitated. Methanol was stripped off by heating the mixture to 80° C., gradually reducing the pressure to 10 mm. to ensure complete stripping. The vessel was sealed and a charging cylinder, precharged with 3 moles (132 gms.) Ethylene oxide, was attached to the charging part after flushing the reaction vessel with nitrogen gas. Ethylene oxide was then charged initially to raise the system to 20-25 p.s.i.g. which is accompanied by an exothermic reaction at which time cooling is applied to maintain the temperature in the range of 105–115° C. Incremental charges of ethylene oxide were appropriately made during a 3 hour period to maintain the system pressure in the range of 20–25 p.s.i.g. until the preweighed ethylene oxide charge has been completed. The mixture was stirred for an additional 1 hour period during which the system pressure dropped to about 15 p.s.i.g. to indicate essentially complete ethylene oxide absorption. The batch was cooled to room temperature and the vessel contents transferred to a glass vessel. The catalyst was neutralized by carefully adding the equivalent $H_2SO_4$ as a 20% aqueous solution. The neutralized products are then stripped at reduced pressure to remove water and methanol. The stripped product is then filtered on a suction funnel to remove the precipitate, sodium sulfate. The recovered light-amber colored filtrate weighed 275 grams.

Analysis of the product corresponded to a composition calculated as:

$$HOC_2H_4(C_2H_4O)_{2.9}-N\begin{matrix}CH_2-CH_2\\ \\CH_2-CH_2\end{matrix}N-C=O\;\;\overset{H}{}$$

Typical examples of formamido-containing hydroxy compounds within the scope of Formula A are listed below accompanied with their formulas:

A. 2-(formamido)ethanol or hydroxyethylformamide $$OHCH_2CH_2-\underset{H}{N}-H$$
$$\overset{CHO}{|}$$

B. 2-(formamidoethylformamido)ethanol $$HOCH_2CH_2-\underset{\overset{|}{CHO}}{N}-CH_2CH_2-\underset{\overset{|}{CHO}}{N}-H$$

C. 2-[formamidotri(ethylformamido)]ethanol $$HOCH_2CH_2(-\underset{\overset{|}{CHO}}{N}-CH_2CH_2)_3-\underset{\overset{|}{CHO}}{N}-H$$

D. 2-[formamidotetro(ethylformamido)]ethanol $$HOCH_2CH_2(-\underset{\overset{|}{CHO}}{N}-CH_2CH_2)_4-\underset{\overset{|}{CHO}}{N}-H$$

E. 2-(methylformamido)ethanol or N-methyl-N-hydroxyethylformamide $$HOCH_2CH_2-\underset{\overset{|}{CHO}}{N}-CH_3$$

F. 2-(cyclohexylformamido)ethanol or N-cyclohexyl-N-hydroxyethyl-formamide $$HOCH_2CH_2-\underset{\overset{|}{CHO}}{N}-C_6H_{11}$$

G. 2-(benzylformamido)ethanol or N-benzyl-N-hydroxyethylformamide $$HOCH_2CH_2-\underset{\overset{|}{CHO}}{N}-CH_2-C_6H_5$$

H. 2-(p-butylphenylformamido)ethanol or N-p-butylphenylformamido)-ethanol $$HOCH_2CH_2-\underset{\overset{|}{CHO}}{N}-C_6H_4C_4H_9(p)$$

I. 2-(methylformamidoethylformamido)ethanol $$HOCH_2CH_2-\underset{\overset{|}{CHO}}{N}-CH_2CH_2-\underset{\overset{|}{CHO}}{N}-CH_3$$

J. 2-(butylformamidoethylformamido)ethanol $$HOCH_2CH_2-\underset{\overset{|}{CHO}}{N}-CH_2CH_2-\underset{\overset{|}{CHO}}{N}-C_4H_9$$

K. Hydroxyethyldiethoxy-N-methylformamide $$HOCH_2CH_2-(OCH_2CH_2)_2-\underset{\overset{|}{CHO}}{N}-CH_3$$

L. Hydroxyethyltetraethoxy-N-methylformamide $$HOCH_2CH_2-(OCH_2CH_2)_4-\underset{\overset{|}{CHO}}{N}-CH_3$$

M. 2-[n-decylformamido-n-hexylformamido(ethoxy)$_{18}$]ethanol or N - hydroxyethyl(polyethoxy)$_{18}$-N' - n - decyl hexamethylene diamine $$HOCH_2CH_2(OCH_2CH_2)_{18}-\underset{\overset{|}{CHO}}{N}-(CH_2)_6-\underset{\overset{|}{CHO}}{N}-C_{10}H_{21}(n)$$

N. 2-[n-octylformamidotri(2-propylformamido)]ethanol or 3,6,9,12-tetraazaformyl-4,7,10-trimethyleicosyl alcohol $$HOCH_2CH_2(-\underset{\overset{|}{CHO}}{N}-\underset{\overset{|}{CH_3}}{CH}CH_2)_3-\underset{\overset{|}{CHO}}{N}-C_8H_{17}(n)$$

O. N-(2-hydroxypropyl)formamide $$HO\underset{\overset{|}{CH_3}}{CH}CH_2-\underset{\overset{|}{CHO}}{N}-H$$

P. N-(2-hydroxypropyl)-N-methylformamide $$HO\underset{\overset{|}{CH_3}}{CH}CH_2-\underset{\overset{|}{CHO}}{N}-CH_3$$

The alkenylsuccinic anhydride reactant is of the formula (D)
$$\begin{matrix}R-CH-C\overset{\displaystyle O}{\diagup}\\ |\qquad\qquad\diagdown\\ \;\;\;\;\;\;\;\;\;\;\;O\\ |\qquad\qquad\diagup\\ CH_2-C\\ \;\;\;\;\;\;\;\;\overset{\|}{O}\end{matrix}$$

wherein R represents an alkenyl radical containing about 12 to 200 carbon atoms and preferably from 30 to 200 carbon atoms. Therefore R will have a molecular weight of about 170 to about 2800. This compound is obtained by reacting maleic anhydride with an appropriate polyolefin.

Other alkenylsuccinic type reactants include alkenylsuccinic acid and alkenylsuccinamic acid wherein the alkenyl group corresponds to the definition of R above.

The alkenylsuccinamic acid is prepared by reacting an alkenylsuccinic anhydride with a compound having the formula:

(E)
$$HN\diagup^A_{\diagdown B}$$

wherein

A is alkyl of 1 to 24 carbon atoms, phenyl, naphthyl, benzyl or alkyl-substituted phenyl, naphthyl or benzyl in which the total alkyl substituents contain up to 24 carbon atoms, and B is hydrogen or alkyl of 1 to 24 carbon atoms.

Representative A groups are methyl, ethyl, butyl, t-butyl, octyl, t-octyl, dodecyl, t-octadecyl, tetracosyl, phenyl, naphthyl, benzyl, butylphenyl, octylphenyl, dodecylphenyl, dioctylphenyl, butylnaphthyl, butylbenzyl, and octylbenzyl. B may be hydrogen, methyl, butyl, octyl, dodecyl, octadecyl, eicosyl and tetracosyl. Preferably either A or B represents a t-alkyl radical with the remaining substituent being hydrogen. Each of A and B may represent a single alkyl group or a mixture of alkyl groups. For example, either A or B may represent a mixture of t-alkyl groups containing 12 to 15 carbon atoms averaging 13 carbon atoms or a mixture of 18 to 24 carbon atoms. Another preferred embodiment is when either A or B is a t-butyl radical and the remaining substituent is hydrogen. The reaction between the Formula D and Formula E compounds to produce alkenyl-succinamic acids is conducted at a temperature of about 0°C. to 200°C., and preferably from 60°C. to 120°C.

The R group of Formula D is derived by polymerizing an olefin containing 2 to 18 carbon atoms, preferably 2 to 8 carbon atoms, by addition polymerization from substantially pure olefins. These olefins may be either gaseous or liquid under normal conditions and frequently are obtained from the cracking of petroleum and other hydrocarbons. Fractions containing olefinically unsaturated open-chain hydrocarbons are readily available over a wide range of molecular weights and derived from olefins of 2 to 18 carbon atoms. The preferred olefins are those from 2 to 8 carbon atoms with particular emphasis on the olefin embodiments containing 4 carbon atoms. It is, of course, preferred to employ relatively pure olefins from which sulfur, cyclic compounds and other impurities have been removed.

Mixtures of various olefins, from ethylene to octadecene, may be used or individual embodiments, as desired. Mixtures of specific olefins, from ethylene to pentene, may be advantageously employed. Particularly advantageous for the present purposes are mixtures of the various butenes. Butenes most commonly used comprise both straight and branched chain members. It is also possible, and frequently desirable, to employ a particular isomer, such as isobutylene, but for the purpose of this invention, separation or isolation of particular isomers is not essential. Thus, the mixtures readily available to the chemical industry are especially useful for the purposes of the present invention. The olefinic polymers employed as starting materials vary from rather fluid liquids to rather viscous liquids at normal temperatures.

Typical olefinic polymers are those prepared from ethylene, propylene, isobutene, 1-butene, 2-butene, 1-pentene, 2-pentene, 1-hexene, 1-octene, 2-octene, 1-decene, 1-dodecene, 2-dodecene and 1-octadecene.

While the group, R, has been structurally presented as attached to a specific carbon atom with respect to Formula D, it will be understood by those skilled in the art that the R group may be positioned on the other carbon atom that is alpha to the other carbonyl group. The R group enters the molecule concerned by a reaction involving maleic anhydride and therefore, could be attached to either of the carbon atoms alpha to the carboxyl group. This invention encompasses fully this aspect.

The polyolefin is first reacted with maleic anhydride at temperatures of about 200° to 250° C. for a period of about 6 to 16 hours, as desired. The maleic anhydride is used in excess, preferably about 1.5 to 3 times the stoichiometric amount. The use of excess maleic anhydride tends to maximize yields. The polyolefin reacts with maleic anhydride to form a succinic anhydride derivative which can be separated from the excess maleic anhydride by vacuum distillation or similar treatment.

The product can be diluted with xylene or similar solvent and filtered.

The alkenylsuccinates of this invention are prepared by reacting an alkenylsuccinic anhydride, acid or amic acid with either a formamido-containing monohydric alcohol (defined in Formula A or C), a formamido-containing dihydric compound (defined in Formula B) or mixtures of both. When monohydric formamido-containing alcohols are employed exclusively, the resultant monoester and diester products may be represented by the following formulas

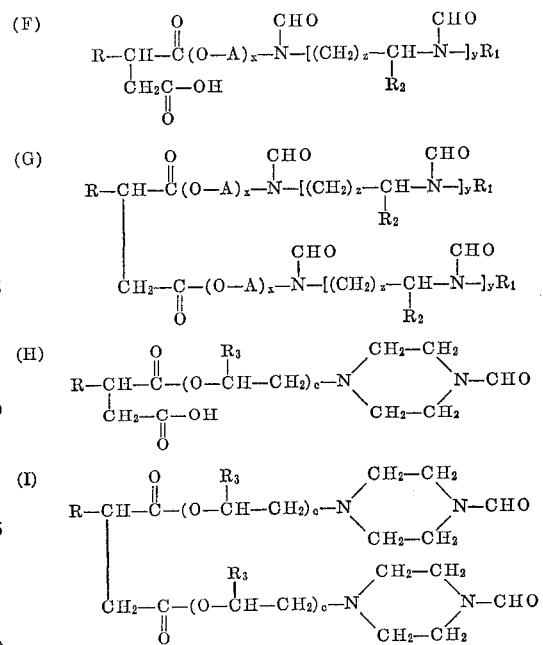

wherein A, R, $R_1$, $R_2$, $R_3$, $c$, $x$, $y$ and $z$ represent the groups defined above.

The acid group in Formula F and Formula H may be esterified by reaction with any alkanol or phenol according to standard techniques and as described in U.S. application Ser. No. 412,237, filed Nov. 18, 1964.

Formula F, G, H and I esters may be prepared by reacting the alkenylsuccinic anhydride, acid or alkenylsuccinamic acid with the desired Formula A or C monohydroxy compound at temperatures of from 25° to 220° C., and preferably from 60° to 150° C. until esterification proceeds to the desired extent. Employing an inert organic solvent in this reaction is discretionary. Formulas F and H represent the products formed by using about 0.5 mole of a Formula A or C compound per mole of polyalkenylsuccinic acid or anhydride.

When formamido-containing dihydric compounds are employed, the resultant product is a long chain polyester material. The reactants for this product may be heated at a temperature range of from 80° to 220° C. and preferably from 120° to 150° C. An inert organic solvent is necessary to azeotrope water from the reaction. Suitable solvents are selected from aromatic hydrocarbons, aliphatic hydrocarbons and halogenated hydrocarbons. The esterification reactions may be conducted in a mineral oil solution or dispersion or in combination with the inert organic solvent. Preferred solvents include benzene, toluene and xylene. Cessation of the evolution of water indicated substantial completion of the reaction.

Another type of product within the scope of this invention is a mixed acid-ester obtained by reacting a dihydric compound as described in Formula B and an alkenylsuccinic anhydride, acid or amic acid in a mole ratio of 0.5 to 1.0. This reaction product would be a diester having the formula (J)
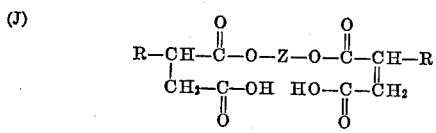

wherein R is as defined above and Z represents the residue of a dihydroxy compound within the scope of Formula B. Similarly one equivalent by weight of a dihydric compound of Formula B may be reacted with two equivalents by weight of an alkenylsuccinamic acid.

In the esterification reactions represented by the above formulas the mole ratio of the alkenylsuccinic anhydride, acid or amic acid to the formamido hydroxy compound may vary from about 1:0.5 to 1:2 or more. Therefore about one-half equivalent to about two moles of formamido hydroxy compound per mole of acid compound is employed.

The compounds of this invention are useful as dispersants in lubricating oil and fuel systems. They may be used in the range of about 0.005 to 15% by weight of the oil or fuel composition and may be incorporated therein according to standard techniques. In fuels, the range is 0.005 to 5%, preferably 0.01 to 2%, by weight of the fuel composition. In lubricants, the range is 0.1 to 15%, preferably 0.1 to 10%, by weight of the lubricant composition. The compounds of the present invention, as evaluated according to several known tests, exhibit outstanding activity as dispersants.

The following describes some of the tests employed in evaluating the compounds of the present invention:

API Service MS Sequence V-A Test.—This test evaluates the sludge dispersant characteristics of a lubricant under low and medium temperature operating conditions. A single cylinder oil test engine is operated under conditions described in ASTM Special Technical Publication No. 315, published by the American Society for Testing and Materials, 1916 Race Street, Philadelphia, Pa. 19103.

The engine may be rated at any time during the course of the test. The 7 parts rated for sludge (CRC Merit, 10=clean) are the rocker arm assembly, rocker arm cover plate, valve deck, timing gear cover, push rod cover plate, push rod chamber and oil pan.

Panel Coker Test.—This test is described in the record of the Fifth World Petroleum Congress (1959) in an article by R. N. Jolie, "Laboratory Screening Test for Lubricating Oil Detergents and Dispersants." A sample of a compound under test is dissolved in a 170 SUS Mid-Continent Solvent Extracted Neutral containing 1% of a thermally unstable zinc dialkyldithiophosphate. The blend is placed in a heated sump and is splashed against a heated panel held at 570° F. for 2 hours. Gain in weight of the panel is determined and compared with oil without the test compound.

Sundstrand Pump Test.—In this test for distillate fuel oils, 1 liter of fuel oil containing 4 grams of synthetic sludge is treated with the additive. The oil is circulated for an hour through a Sundstrand oil burner pump containing a 100-mesh strainer. The sludge deposit is collected and weighed (Nelson, Osterhaut and Schwindeman, Ind. Eng. Chem., 48, 1892 (1956)).

As will be clearly understood in the art, the fuels contemplated are distillate fuels that boil from 75° to 750° F. which includes gasolines, along with jet and diesel fuels and furnace oils. The present compounds are particularly useful in fuels that boil up to about 600° F., that is, the normal gasolines and jet fuels and similar liquid hydrocarbon fuels.

Lubricating compositions of this invention may be based on mineral oils or on synthetic lubricants. The mineral oils may vary over a wide range of viscosity, such as 1 to 25 cs. at 210° F. These oils may be of naphthenic or paraffinic nature or may be of various mixtures. They may be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as S.A.E. 5 to S.A.E. 50. Other types of lubricants are also included, such as hydraulic and automatic transmission fluids.

The synthetic lubricants include esters, such as dioctyl, dinonyl or diisodecyl adipates, azelates or sebacates, polyethers and silicones. When use as hydraulic fluids is contemplated, phosphate esters are included as a base.

In the present compositions, there may also be used as a base, a transmission fluid, hydraulic fluid, gear oil or grease.

In the compositions of this invention, there may be used one or more other additives, such as anti-oxidants, anti-foam agents, anti-rust agents, anti-wear agents, heavy duty detergents, pour-point depressants, viscosity index improvers, or other type of additive. For example, there may be employed one or more of the dithiophosphates, such as zinc, barium or nickel dialkyldithiophosphate, sulfurized oils, such as sulfurized sperm oil and sulfurized terpenes, phenols, sulfides, alkylaryl sulfonates, petroleum sulfonates, whether normal or with alkaline reserve, such as calcium, barium or magnesium petroleum sulfonates, polymers and copolymers from alkyl acrylates, methacrylates, itaconates or fumarates or vinyl carboxylates and mixtures thereof, copolymers of acrylic esters and polar monoethylenically unsaturated compounds, such as N-vinyl-2-pyrrolidinone, vinylpyridines, aminoalkyl acrylates or methacrylates or polyethylene-glycol acrylic esters, polybutenes, alkylphenol-alkylene oxide condensates, alkenylsuccinic anhydrides, various silicones and alkyl or aryl phosphates, such as tricresyl phosphates.

There may also be used 4,4′-methylenebis-2,6-di-tert-butylphenol, trialkylphenols, tris(dimethylaminomethyl) phenol, phenothiazine, naphthylamines, N′-sec-butyl-N,N-dimethyl-p-phenylenediamine, alkaline earth alkylphenates, alkaline earth salicylates, calcium phenylstearate, alkylamines, especially $C_{12}$-$C_{24}$ alkylamines, cyclic amines, alkyl and aryl imidazolines and alkenylsuccinic anhydrides reacted with amines and then with boron compounds, such as boron oxide, boron halides and boron esters.

A turbo prop lubricant may be prepared by blending the compounds of this invention with di-2-ethylhexyl sebacate and a mixture of polyesters formed by condensing 2-ethyl-1,3-hexane-diol and sebacic acid into the polyesters with 2-ethylhexanol, there being an average of about 3 glycol units per molecule. This composition may also contain anti-oxidant, stabilizer or other useful additives.

The compounds, compositions and method of the present invention may be more fully understood from the following examples which are offered by way of illustration and not by way of limitation. Parts by weight are used throughout.

EXAMPLE 1

The monoester of polybutenylsuccinic anhydride and 2-(formamidoethylformamido)ethanol was prepared by heating the following materials with stirring at 75° C. for 3 hours:

441 gms. of a 90% in xylene solution of polybutenylsuccinic anhydride containing 0.488 millimoles of anhydride per gram (made from maleic anhydride and polybutene of molecular weight 1350) and 34.5 gms. of 2-(formamidoethylformamido)-ethanol At the end of this heating period, the infrared peaks at 5.4 and 5.6 microns, characteristic of the anhydride group, had disappeared. The alkenylsuccinate half-ester product was then isolated as a viscous, clear dark amber liquid by stripping of the volatile components for 2 hours at 80° C./ 0.3 mm. Hg pressure and filtering. The material had a total nitrogen content of 1.39% (theory=1.43).

In the Panel Coker Test, a blend containing 1.0% of the above alkenylsuccinate gives a deposit weight of 22 mg. The same oil without the additive gives a deposit weight of 322 mg.

In the Sundstrand Pump Test at 0.01 gram in 100 ml. of oil, the weight of sludge is 3 mg., while the oil without any additive gives 240 mg.

1.5 parts of the above alkenylsuccinate is blended with 1.0 part of a commercial zinc dialkyl dithiophosphate, 6.0 parts of a commercial polymethacrylate VI improver into 91.5 parts of a 170 SUS Mid-Continent Solvent Extracted Neutral Oil. The viscosity of this blend is 11.21 cst. at 210° F. and 61.27 cst. at 100° F. with a viscosity index of 148. The ASTM pour point is −30° F. This blend is evaluated in the Sequence V–A test giving a sludge rating at the end of 75 hours of engine operation of 66.8 (70.0= clean). The value for the reference oil alone is 39.7.

EXAMPLE 2

Preparation of monoester from polybutenylsuccinic anhydride and 2-[formamidotetra(ethylformamido)]ethanol.

The following materials were reacted according to the procedure used in Example 1.

485 grams of a 90% in xylene solution of polybutenylsuccinic anhydride containing 0.488 millimoles of anhydride per gram (made from maleic anhydride and polybutene of molecular weight 1350) and 63.5 grams of 2-[formamidotetra(ethylformamido)]-ethanol.

The clear, viscous, dark amber alkenylsuccinate half-ester product had no anhydride content based on infrared analysis and contained 2.04% total nitrogen (theory=2.48).

In the Panel Coker Test, a blend containing 1.0% of the above alkenylsuccinate gives a deposit weight of 34 mg. The same oil without the additive gives a deposit weight of 322 mg.

In the Sundstrand Pump Test at 0.01 gram in 100 ml. of oil, the weight of sludge is 3 mg., while the oil without any additive gives 240 mg.

1.5 parts of the above alkenylsuccinate is blended with 1.0 part of a commercial zinc dialkyl dithiophosphate, 6.0 parts of a commercial polymethacrylate VI improver into 91.50 parts of a 170 SUS Mid-Continent Solvent Extracted Neutral Oil. The viscosity of this blend is 11.22 cst. at 210° F. and 61.31 cst. at 100° F. with a viscosity index of 148. The ASTM pour point is −30° F. This blend is evaluated in the Sequence V–A test giving a sludge rating at the end of 75 hours of engine operation of 68.2 (70.0= clean). The value for the reference oil alone is 39.7.

EXAMPLE 3

Preparation of the diester from polybutenylsuccinic anhydride and N-hydroxyethyl-N′-formylpiperazine.

The following materials were charged to a reaction flask equipped with a water separator and a stirrer:

405 gms. of a 90% in xylene solution of polybutenylsuccinic anhydride containing 0.488 millimoles of anhydride per gram (made from maleic anhydride and polybutene of molecular weight 1350)

63.4 gms. of N-hydroxyethyl-N′-formylpiperazine and 200 gms. of xylene.

The components were stirred and heated at 143° to 145° C. for 7 hours, during which time the theoretical amount of water had collected in the water separator. The material was stripped of volatile components at 130° C./0.3 mm. Hg pressure for 2 hours and filtered. The clear, viscous, light amber alkenylsuccinate product had a basic nitrogen content of 1.20% (theory 1.30).

In the Panel Coker Test, a blend containing 1.0% of the above alkenylsuccinate gives a deposit weight of 21 mg. The same oil without the additive gives a deposit weight of 322 mg.

In the Sundstrand Pump Test at 0.01 gram in 100 ml. of oil, the weight of sludge is 8 mg., while the oil without any additive gives 225 mg.

1.5 parts of the above alkenylsuccinate is blended with 1.0 part of a commercial zinc dialkyl dithiophosphate, 6.0 parts of a commercial polymethacrylate VI improver and 2.0 parts of a basic sulfonate (TBN=300) into 89.5 parts of a 170 SUS Mid-Continent Solvent Extracted Neutral Oil. The ASTM pour point is −35° F. This blend is evaluated in the Sequence V–A test giving a sludge rating at the end of 75 hours of engine operation of 68.0 (70.0= clean). The value for the reference oil alone is 39.7.

EXAMPLE 4

Preparation of the diester from polybutenylsuccinic anhydride and N-methyl-N-hydroxyethylformamide.

The following materials were charged to a reaction flask equipped with a water separator and a stirrer:

373 gms. of polybutenylsuccinic anhydride containing 0.645 millimole of anhydride per gram (made from maleic anhydride and polybutene of molecular weight 1450), 41.9 gms. of N-methyl-N-hydroxyethylformamide and 150 gms. of toluene.

The components were heated at reflux temperature (130° to 135° C.) for 14 hours, after which time the theoretical amount of water had been collected in the water separator. The material was stripped of volatile components at 130° C./0.25 mm. for 2 hours and filtered. The clear, viscous, light amber liquid alkenylsuccinate had a nitrogen content of 1.37% (theory=1.61%).

In the Panel Coker Test, a blend containing 1.0% of the above alkenylsuccinate gives a deposit weight of 50 mg. The same oil without the additive gives a deposit weight of 322 mg.

In the Sundstrand Pump Test at 0.01 gram in 100 ml. of oil, the weight of sludge is 8 mg., while the oil without any additive gives 220 mg.

1.45 parts of the above alkenylsuccinate is blended with 1.0 part of a commercial zinc dialkyl dithiophosphate, 6.0 parts of a commercial polymethacrylate VI improver into 91.55 parts of a 170 SUS Mid-Continent Solvent Extracted Neutral Oil. The viscosity of this blend is 11.12 cst. at 210° F. and 62.17 cst. at 100° F. with a viscosity index of 146. The ASTM pour point is −30° F. This blend is evaluated in the Sequence V–A test giving a sludge rating at the end of 75 hours of engine operation of 68.2 (70.0=clean). The value for the reference oil alone is 39.7.

1.45 parts of the above alkenylsuccinate is blended with 1.0 part of a commercial zinc dialkyl dithiophosphate, 6.0 parts of a commercial polymethacrylate VI improver and 2.0 parts of a basic calcium sulfonate (TBN=300) into 89.55 parts of a 170 SUS Mid-Continent Solvent Extracted Neutral Oil. The viscosity of this blend is 11.39 cst. at 210° F. and 63.64 cst. at 100° F. with a viscosity index of 146. The ASTM pour point is −30° F. This blend is evaluated in the Sequence V–A test giving a sludge rating at the end of 75 hours of engine operation of 66.4 (70.0=clean). The value for the reference oil alone is 39.7.

EXAMPLE 5

Preparation of the diester from polybutenylsuccinic anhydride and N-methyl-N-hydroxyethylformamide.

The following materials were reacted in the same manner as in Example 4:

884 gms. of a 90% in xylene solution of polybutenylsuccinic anhydride (with anhydride content of 0.72 millimole/gram), made from maleic anhydride and polybutene of molecular weight 1000, 136.2 gms. of N-methyl-N-hydroxyethylformamide and 100 cc. toluene.

The final alkenylsuccinate product, after stripping and filtration, had a nitrogen content of 1.6% (theory=1.97).

In the Panel Coker Test, a blend containing 1.0% of the above alkenylsuccinate gives a deposit weight of 103 mg. The same oil without the additive gives a deposit weight of 322 mg.

In the Sundstrand Pump Test at 0.01 gram in 100 ml. of oil, the weight of sludge is 5 mg., while the oil without any additive gives 220 mg.

1.4 parts of the above alkenylsuccinate is blended with 1.0 part of a commercial zinc dialkyl dithiophosphate, 6.0 parts of a commercial polymethacrylate VI improver into 91.6 parts of a 170 SUS Mid-Continent Solvent Extracted Neutral Oil. The viscosity of this blend is 11.08 cst. at 210° F. and 61.75 cst. at 100° F. with a viscosity index of 146. The ASTM pour point is −30° F. This blend is evaluated in the Sequence V–A test giving a sludge rating at the end of 75 hours of engine operation of 66.1 (70.0=clean). The value for the reference oil alone is 39.7.

EXAMPLE 6

A polyester was prepared from an equimolar ratio of the polybutenylsuccinic anhydride solution of Example 1 (460 parts) and diethanolformamide (29.8 parts) by heating the components at reflux (143–145° C.) in 250 parts of xylene for seven hours, using a water separator. At the end of this time the theoretical amount of water (40 ml.) had been collected. The reaction mixture was stripped free of the solvent at 130° C./0.3 mm. Hg. and filtered. The alkenylsuccinate polyester product had an acidity of 0.028 millimole/gm. and contained 0.70% N (theory=0.70).

In the Panel Coker Test, a blend containing 1.0% of the above alkenylsuccinate polyester gives a deposit weight of 17 mg. The same oil without the additive gives a deposit weight of 322 mg.

In the Sundstrand Pump Test at 0.01 gram in 100 ml. of oil, the weight of sludge is 6 mg., while the oil without any additive gives 240 mg.

1.55 parts of the above alkenylsuccinate polyester is blended with 1.0 part of 4,4′-methylene-bis-2,6-di-tert-butylphenol, 6.0 parts of a commercial polymethacrylate VI improver into 91.45 parts of a 170 SUS Mid-Continent Solvent Extracted Neutral Oil. The viscosity of this blend is 11.27 cst. at 210° F. and 61.34 cst. at 100° F. with a viscosity index of 148. The ASTM pour point is −30° F. This blend is evaluated in the Sequence V–A test giving a sludge rating at the end of 75 hours of engine operation of 67.4 (70.0=clean). The value for the reference oil alone is 39.7.

EXAMPLE 7

A mixed acid-ester was prepared from 440 parts of the polybutenylsuccinic anhydride solution of Example 1 and 13.1 parts of diethanolformamide by heating a stirred mixture of the two reactants at 50–70° C. for four hours. At this point infrared analysis showed the reaction to be complete by disappearance of anhydride functionality. The acid-ester product was isolated by vacuum stripping at 100° C., and filtering. Acidity=0.54 millimole/gm.; percent N=0.35 (theory=0.34).

In the Panel Coker Test, a blend containing 1.0% of the above acid-ester product gives a deposit weight of 22 mg. The same oil without the additive gives a deposit weight of 322 mg.

In the Sundstrand Pump Test at 0.01 gram in 100 ml. of oil, the weight of sludge is 7 mg., while the oil without any additive gives 240 mg.

EXAMPLE 8

Preparation of a monoester from polybutenylsuccinic anhydride and 2 - [formamidotri(ethylformamido)]ethanol.

The following materials were allowed to react according to the procedure in Example 1:

487 parts of the polybutenylsuccinic anhydride solution of Example 1 and
59.5 parts of 2-[formamidotri(ethylformamido)]ethanol.

The clear, viscous, dark amber alkenylsuccinate half-ester product was free of anhydride content and contained 1.78% nitrogen (theory=2.25).

In the Panel Coker Test, a blend containing 1.0% of the above alkenylsuccinate gives a deposit weight of 18 mg. The same oil without the additive gives a deposit weight of 322 mg.

In the Sundstrand Pump Test at 0.01 gram in 100 ml. of oil, the weight of sludge is 5 mg., while the oil without any additive gives 240 mg.

EXAMPLE 9

A mixture of 230 parts of the polybutenylsuccinic anhydride solution of Example 1, 22.5 parts of hydroxyethylformamide, and 100 parts of xylene was heated to reflux at 155–160° C. for three hours, at which point the theoretical amount of water (2.0 ml.) had been collected. The dark, amber viscous alkenylsuccinate product was obtained by vacuum stripping and filtering. Acidity=0.08 millimole/gm.

In the Panel Coker Test, a blend containing 1.0% of the above alkenylsuccinate gives a deposit weight of 25 mg. The same oil without the additive gives a deposit weight of 322 mg.

In the Sundstrand Pump Test at 0.01 gram in 100 ml. of oil, the weight of sludge is 93 mg., while the oil without any additive gives 220 mg.

EXAMPLE 10

A mixture of 505.0 parts of a 90% in xylene solution of a polybutenylsuccinic anhydride with an anhydride content of 0.46 millimole/gm. (made from maleic anhydride and polybutene of molecular weight 1195), 67.7 parts of hydroxyethyldiethoxy-N-methylformamide and 200 parts of xylene was refluxed at 140–144° C. for seventeen hours, using a water separator. At the end of this time the water evolution had ceased. The material was then vacuum stripped of solvent and filtered. The amber, viscous alkenylsuccinate product had an acidity of 0.07 millimole/gm. and a nitrogen content of 1.16%. (theory=1.25%).

In the Panel Coker Test, a blend containing 1.0% of the above alkenylsuccinate gives a deposit weight of 30 mg. The same oil without the additive gives a deposit weight of 322 mg.

In the Sundstrand Pump Test at 0.01 gram in 100 ml. of oil, the weight of sludge is 32 mg., while the oil without any additive gives 187 mg.

EXAMPLE 11

A diester from the following reactants was prepared according to the procedure of Example 10:

244 parts of the polybutenylsuccinic anhydride solution of Example 10, 53.1 parts of hydroxyethyltetraethoxy-N-methylformamide and
100 parts of xylene.

After vacuum stripping and filtering, the amber, viscous alkenylsuccinate product was found to have an acidity of 0.11 millimole/gm.

In the Panel Coker Test, a blend containing 1.0% of the above alkenylsuccinate gives a deposit weight of 28 mg. The same oil without the additive gives a deposit weight of 322 mg.

In the Sundstrand Pump Test at 0.01 gram in 100 ml. of oil, the weight of sludge is 24 mg., while the oil without any additive gives 179 mg.

EXAMPLE 12

A mixture of 205 parts of a polybutenylsuccinic anhydride containing 0.488 millimole of anhydride per gram (made from maleic anhydride and polybutene of molecular weight 1350), 81 parts of N-formyl-N-hydroxyethyl (polyoxyethyl)$_{18}$-N'-formyl-N'-decyl hexamethylenediamine and 50 parts of xylene was heated for ten hours with stirring at 95–90° C. At the end of this time the mixture was completely homogeneous and infrared analysis showed essentially complete disappearance of the anhydride peaks. Vacuum stripping of the volatile solvent gave the product as a clear, dark, viscous liquid. Percent N=0.90 (theory=0.98). The reaction product may be represented by the formula

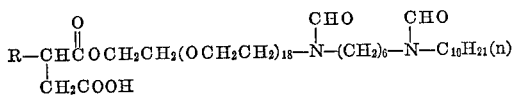

wherein R is a polyalkenyl radical having a molecular weight of about 1350.

In the Panel Coker Test, a blend containing 1.0% of the above acid-ester gives a deposit weight of 30 mg. The same oil without the additive gives a deposit weight of 322 mg.

EXAMPLE 13

A mixture of 410 parts of the polybutenylsuccinic anhydride described in Example 12, 75.2 parts of 3,6,9,12-tetraazaformyl-4,7,10-trimethyleicosyl alcohol and 50 parts of xylene was heated with stirring at 70–80° C. for twelve hours. Complete reaction to the monoester was indicated by infrared analysis. The product was isolated from the volatile solvent by vacuum stripping at 80° C./1 mm. percent N=2.3 (theory=2.31). The acid-ester product may be represented by the formula

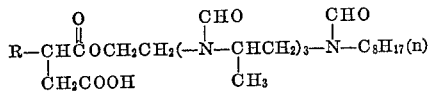

wherein R is a polyalkenyl radical having a molecular weight of about 1350.

In the Panel Coker Test, a blend containing 1.0% of the above acid-ester gives a deposit weight of 28 mg. The same oil without the additive gives a deposit weight of 322 mg.

EXAMPLE 14

A mixture of 1390 grams of a 90% solution in xylene of polybutenylsuccinic anhydride (prepared from maleic anhydride and polybutene of molecular weight 950), with an anhydride content of 0.720 millimole/gram, and 130 grams of t-octylamine is stirred and heated at 100° C. for 10 hours. Vacuum stripping of the solvents and unreacted t-octylamine produce the intermediate amic acid (percent N=0.90). Equimolar quantities of the amic acid and N-methyl-N-hydroxyethylformamide are reacted according to the procedure in Example 4 and the final alkenylsuccinamate product was vacuum stripped and filtered.

In the Panel Coker Test, a blend containing 1.0% of the above alkenylsuccinamate gives a deposit weight of 55 mg. The same oil without the additive gives a deposit weight of 322 mg.

Similar test results were obtained when Examples 3 and 4 were repeated, except chlorinated polypropene having a number average molecular weight of about 900 and a chlorine content of 3.9% was employed in lieu of the polybutene. The polypropenylsuccinic anhydride analyzes 0.91 millimole of anhydride per gram of material.

What is claimed is:
1. The product of an esterification reaction between (1) a compound selected from the group consisting of alkenylsuccinic anhydrides, alkenylsuccinic acids and alkenylsuccinamic acids wherein the alkenyl group contains about 12 to 200 carbon atoms, and (2) at least one formamido-containing hydroxy compound having the formula:

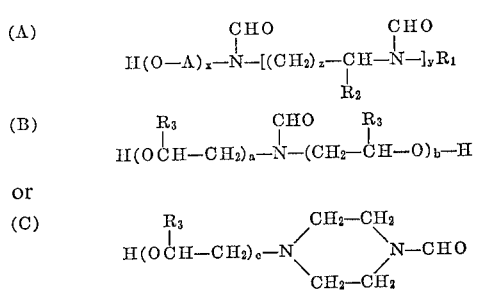

wherein
A is an alkylene group having 2 to 4 carbon atoms,
R$_1$ is hydrogen, a (C$_1$–C$_2$)-alkyl group, a (C$_5$ to C$_7$)-cyclic aliphatic group, phenyl, benzyl, or a (C$_1$ to C$_4$)-alkyl substituted phenyl,
R$_2$ and R$_3$ are independently selected from hydrogen and methyl,
$a$ is an integer having a value of at least 1,
$b$ is an integer having a value of at least 1 and the sum of $a$ plus $b$ has a value of from 2 to 30,
$c$ is an integer having a value of from 1 to 5,
$x$ is an integer having a value of from 1 to 30,
$y$ is an integer having a value of from 0 to 4 and
$z$ is an integer having a value of from 1 to 5.
2. A product of claim 1 wherein said compound (1) is an alkenylsuccinic anhydride.
3. A product of claim 2 wherein the alkenylsuccinic anhydride is a polybutenylsuccinic anhydride.
4. A product of claim 1 wherein said compound (1) is an alkenylsuccinic anhydride and said compound (2) is selected from Formula A.
5. A product of claim 4 wherein said alkenylsuccinic anhydride is a polybutenylsuccinic anhydride.
6. A product of claim 1 wherein said compound (1) is a polybutenylsuccinic anhydride and said compound (2) is selected from Formula A wherein R$_1$ is hydrogen, A is ethylene, $x$ is 1, and $y$ is 0.
7. A product of claim 1 wherein said compound (1) is a polybutenylsuccinic anhydride and said compound (2) is selected from Formula A wherein R$_1$ is methyl, A is ethylene, $x$ is 1 and $y$ is 0.
8. A product of claim 1 wherein said compound (1) is a polybutenylsuccinic anhydride and said compound (2) is selected from Formula A wherein R$_1$ and R$_2$ are hydrogen, A is ethylene and $x$, $y$ and $z$ are each 1.
9. A product of claim 1 wherein said compound (1) is a polybutenylsuccinic anhydride and said compound (2) is selected from Formula B wherein R$_3$ is hydrogen and $a$ and $b$ are each 1.
10. A composition comprising a major proportion of a lubricating oil and a minor proportion, sufficient to reduce sludge deposition, of a product of claim 1.
11. A composition comprising a major proportion of a mineral lubricating oil and a minor proportion, sufficient to reduce sludge deposition, of a product of claim 4.
12. A composition comprising a major proportion of a liquid fuel and a minor proportion, sufficient to reduce sludge deposition, of a product of claim 1.

13. A composition comprising a major proportion of a liquid fuel and a minor proportion, sufficient to reduce sludge deposition, of a product of claim 4.

References Cited

UNITED STATES PATENTS

| | | |
|---|---|---|
| 3,184,474 | 5/1965 | Catto et al. |
| 3,185,704 | 5/1965 | Kahn et al. |
| 3,219,666 | 11/1965 | Norman et al. |
| 3,281,356 | 10/1966 | Coleman. |
| 3,311,558 | 3/1967 | Prizer et al. |
| 3,331,776 | 7/1967 | Krukziener _____ 252—56 |
| 3,381,022 | 4/1968 | LeSuer. |

DANIEL E. WYMAN, *Primary Examiner.*

W. J. SHINE, *Assistant Examiner.*

U.S. Cl. X.R.

44—63, 71; 260—485